(12) United States Patent
Inoue et al.

(10) Patent No.: US 7,003,790 B1
(45) Date of Patent: Feb. 21, 2006

(54) BROADCAST-PROGRAM SELECTION HISTORY INFORMATION ACQUISITION APPARATUS AND ITS METHOD

(75) Inventors: Hajime Inoue, Chiba (JP); Shinji Kakuyama, Tokyo (JP); Kiyoshi Shimizu, Kanagawa (JP); Susumu Nagano, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/238,261

(22) Filed: Jan. 27, 1999

(30) Foreign Application Priority Data

| Jan. 31, 1998 | (JP) | ............................. P10-033827 |
| Jan. 31, 1998 | (JP) | ............................. P10-033828 |
| Jan. 31, 1998 | (JP) | ............................. P10-033829 |
| Jan. 31, 1998 | (JP) | ............................. P10-033830 |
| Apr. 30, 1998 | (JP) | ............................. P10-137677 |
| Apr. 30, 1998 | (JP) | ............................. P10-137678 |

(51) Int. Cl.
*H04N 9/00* (2006.01)

(52) U.S. Cl. ............................. 725/10; 725/9; 725/13; 725/14; 725/16; 725/21; 725/46; 725/66; 370/486; 370/487; 370/522

(58) Field of Classification Search ............. 725/9–21, 725/46, 66, 34–35, 60–61; 370/486, 487, 370/522; 386/1, 183
See application file for complete search history.

(56) References Cited

U.S. PATENT DOCUMENTS

| 4,697,209 A | * | 9/1987 | Kiewit et al. ................. 358/84 |
| 4,945,563 A | * | 7/1990 | Horton et al. ................. 380/5 |
| 5,053,883 A | * | 10/1991 | Johnson ....................... 725/114 |
| 5,382,970 A | * | 1/1995 | Kiefl ........................... 455/2.01 |
| 5,463,671 A | * | 10/1995 | Marsh et al. ................. 379/56.1 |
| 5,533,103 A | * | 7/1996 | Peavey et al. ................ 379/69 |
| 5,535,206 A | * | 7/1996 | Bestler et al. ................ 370/458 |
| 5,600,712 A | * | 2/1997 | Hanson et al. ............... 379/142.06 |
| 5,612,993 A | * | 3/1997 | Hanaoka et al. ............. 379/100.03 |
| 5,675,635 A | * | 10/1997 | Vos et al. .................... 379/112.01 |
| 5,727,048 A | * | 3/1998 | Hiroshima et al. .......... 379/93.12 |
| 5,758,257 A | * | 5/1998 | Herz et al. ................... 725/116 |
| 5,767,895 A | * | 6/1998 | Yashiro et al. ............... 725/106 |
| 5,798,785 A | * | 8/1998 | Hendricks et al. ........... 725/46 |
| 5,828,748 A | * | 10/1998 | Akhteruzzaman ........... 379/399.01 |
| 5,872,588 A | * | 2/1999 | Aras et al. ................... 725/14 |
| 5,903,635 A | * | 5/1999 | Kaplan ........................ 379/133 |
| 5,960,348 A | * | 9/1999 | Eisdorfer et al. ............ 455/445 |
| 5,974,299 A | * | 10/1999 | Massetti ...................... 455/2 |
| 6,088,439 A | * | 7/2000 | Martz et al. ................. 379/230 |
| 6,111,872 A | * | 8/2000 | Suemastsu et al. .......... 370/350 |
| 6,177,931 B1 | * | 1/2001 | Alexander et al. .......... 345/327 |

(Continued)

FOREIGN PATENT DOCUMENTS

WO    WO 94/17609    *    8/1994

*Primary Examiner*—Chris Kelley
(74) *Attorney, Agent, or Firm*—Lerner, David, Littenberg, Krumholz & Mentlik, LLP

(57) ABSTRACT

In a broadcast-program selection history information acquisition apparatus and its method, the totalization side can easily totalize selection history information. To acquire the selection history information of a broadcast program selected out of broadcast programs of a plurality of channels, the selection information of the broadcast program is stored at a predetermined acquisition timing and the selection history information which is composed of a plurality of pieces of selection information stored every plurality of acquisition timings is transmitted to a notification destination at a predetermined transmission timing.

18 Claims, 10 Drawing Sheets

U.S. PATENT DOCUMENTS

| | | | |
|---|---|---|---|
| 6,202,210 B1 * | 3/2001 | Ludtke ........................ | 725/20 |
| 6,253,095 B1 * | 6/2001 | Ushida ....................... | 455/565 |
| 6,282,210 B1 * | 8/2001 | Rapport et al. ............. | 370/518 |
| 6,298,482 B1 * | 10/2001 | Seidman et al. ............ | 725/101 |
| 6,330,719 B1 * | 12/2001 | Zigmond et al. ............ | 725/121 |
| 6,430,286 B1 * | 8/2002 | Bhusri ........................ | 379/269 |
| 6,462,832 B1 * | 10/2002 | Malik ......................... | 358/1.15 |
| 6,546,006 B1 * | 4/2003 | Fraser ........................ | 370/359 |

* cited by examiner

RECORD UNDER MUSIC DOWN-LOAD

RECORD OF DOWN-LOAD INCLUDING UPGRADING OF IRD PROGRAM

AUDIENCE RECORD UNDER DISPLAY OF EPG SCREEN

AUDIENCE RECORD UNDER EXECUTION OF TIMER RESERVATION

AUDIENCE RECORD UNDER VIEWING OR RECORDING AFTER PURCHASE OF BROADCAST-PROGRAM

BROADCAST-PROGRAM SELECTION HISTORY INFORMATION ACQUISITION APPARATUS AND ITS METHOD

BACKGROUND OF THE INVENTION

1. Field of the Invention

The present invention relates to a broadcast-program selection history information acquisition apparatus and its method and is preferably applied to a broadcast-program selection history information acquisition apparatus and its method for storing data as a basis of collecting the audience-rating of a television broadcast program (hereinafter, referred to as audience-rating data) in satellite broadcasting and transmitting it to an audience-rating totalization center.

2. Description of the Related Art

The audience-rating of an analog-television broadcast program telecasted from a broadcasting station is examined by a specific audience-rating examination system with, for example, the number of samples of approximately 500 to 600 households. The audience-rating examination system acquires the audience-rating data by a specific adapter installed in a television receiver of an audience, and transfers the audience-rating data to a predetermined totalization center. The predetermined totalization center computes the audience-rating result of each broadcast program based on the audience-rating data thus totalized, and communicates the result to a broadcasting enterprise or a broadcast program production company.

The broadcasting enterprise considers the continuation or end of the broadcast program based on the audience-rating result for each broadcast program and reports the audience-rating result to a sponsor company broadcasting commercials in the intervals of a broadcast program, and thereby continues a sponsor contract or picks out a new sponsor company of broadcasting commercials based on the audience-rating result. Moreover, the broadcast program production company decides the degree of the popular spirit of the broadcast program based on the audience-rating result and studies the contents of a new broadcast program to be next produced.

Therefore, the audience-rating result is a very important factor for the broadcasting enterprise or the broadcast program production company, and it is desired that the audience-rating result is computed based on the audience-rating data of audiences as many as possible.

By the way, satellite broadcasting using a communications satellite is realized in recent years and there is a receiver referred to as an integrated receiver decoder (IRD) which receives a digitized television signal. The IRD can selectively receive a multiplicity of broadcast programs encoded and broadcasted in a predetermined digital picture compression method from a broadcasting station, and display the broadcast program selected by a user on a monitor or a television receiver by decoding the broadcast program through an internal decoder.

In the IRD having the above structure, a pay-per-view program can be watched. That is, when an user watches the pay-per-view program, the audience history information is stored in the IC card which is removably mounted on the IRD. The IRD comprising a modem, reads the audience history information stored in IC card at a predetermined timing, and transfers the read audience history information to a charging center through the modem and the public telephone network. Thereby, the user is charged for the watched pay-per-view program.

Conventionally, in such digital broadcasting, the IRD is not provided with the function of collecting the audience-rating data. Therefore, in the digital broadcasting, to collect the audience-rating data, there is no means but to install a predetermined adapter in the outside of the IRD as same as in the analog broadcasting.

SUMMARY OF THE INVENTION

In view of the foregoing, an object of this invention is to provide a broadcast-program selection history information acquisition apparatus and its method, in which the function of collecting the audience-rating data is set in the IRD for receiving the digital broadcasting, and a different function from the audience-data collection in the conventional analog broadcasting can be performed.

The foregoing object and other objects of the invention have been achieved by the provision of a broadcast-program selection history information acquisition apparatus and its method, in case of acquiring the selection history information of a broadcast program selected out of broadcast programs of a plurality of channels, the selection information of the broadcast program is stored at a predetermined acquisition timing and the selection history information including a plurality of pieces of selection information stored every plurality of acquisition timings is transmitted to a notification destination at a predetermined transmission timing.

Since the selection history information including a plurality of pieces of selection information stored at a predetermined acquisition timing is transmitted to the predetermined notification destination, it is possible for the totalization side to easily totalize the transmitted selection history information only by receiving the information.

Moreover, it is possible to accurately acquire the audience states of users in detail by including additional information showing the type of a selected broadcast program and the audience mode of the broadcast program in selection information and moreover, safely totalize the selection information by enciphering and transmitting the acquired selection information to the notification destination.

Moreover, in the case of acquiring the selection history information of the broadcast program selected out of broadcast programs of a plurality of channels, the selection information at the selection timing when the broadcast program is selected is stored and the selection history information including a plurality of pieces of selection information stored every plurality of selection timings is transmitted to the notification destination at a predetermined transmission timing.

By storing the selection history information consisting of only a plurality of pieces of selection information at a plurality of selection timings when broadcast programs are selected, it is possible to greatly reduce the amount of data compared to the case of storing the selection history information of the broadcast program selected at the timing of a predetermined time interval.

Moreover, the present invention operates based on predetermined power supplied from power supply means; in the case of acquiring the selection history information of the broadcast program selected out of broadcast programs of a plurality of channels, the selection information of the broadcast program is stored at a predetermined acquisition timing, the selection history information including a plurality of pieces of selection information stored every plurality of acquisition timings is transmitted to the notification destination at a predetermined transmission timing; and in the case where it is set to store and transmit the selection history information after start of the input of the power is detected, the selection history information is stored and transmitted.

By storing and transmitting the selection history information only in the case where it is set to store and transmit the selection history information after start of supplying the power is detected, it is possible to protect the privacy of a user without storing and transmitting the selection history information against the intention of the user.

Moreover, in the case of acquiring the selection history information of the broadcast program selected out of broadcast programs of a plurality of channels, the selection information of the broadcast program is stored at a predetermined acquisition timing and the selection history information including a plurality of pieces of selection information stored every plurality of acquisition timings is transmitted at an intrinsically-assigned predetermined transmission timing.

By transmitting the selection history information of the selected broadcast program at an intrinsically-assigned predetermined transmission timing, it is possible to prevent external transmission and calls from congesting and to efficiently transmit the information.

Moreover, it is possible to accurately totalize the selection history information for each broadcast-program selection history information acquisition apparatus, by transmitting a control number (identification number) intrinsically assigned to each broadcast-program selection history information acquisition apparatus together with selection history information to a totalization center; and it is possible to easily perform high-versatility totalization on selection history information, by optionally changing the contents or transmission time of the selection history information.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 7A and 7B are schematic diagrams showing the structure of additional information;

DETAILED DESCRIPTION OF THE EMBODIMENT

Figure 1:
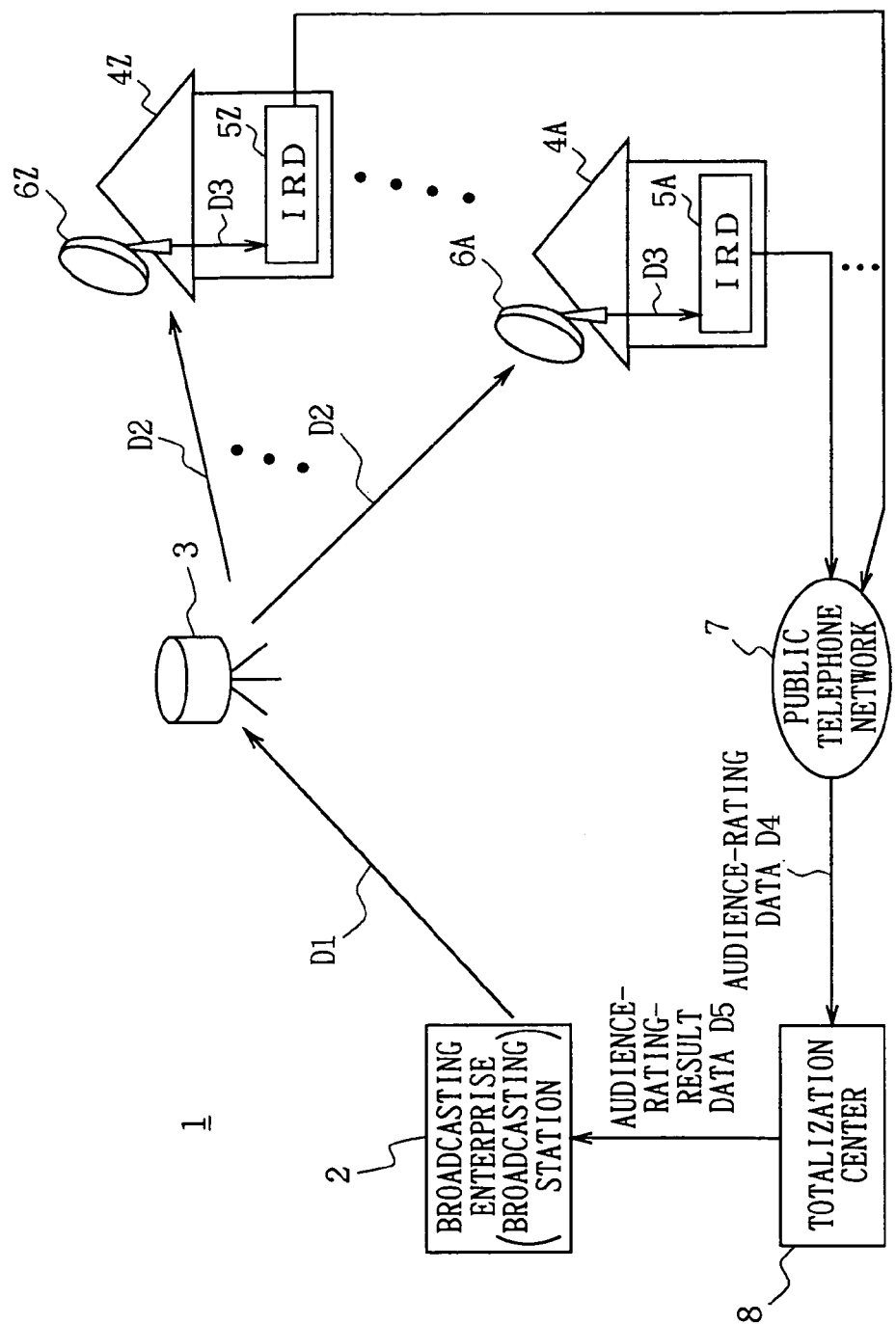
FIG. 1 is a block diagram showing the structure of an audience-rating examination system according to the present invention.

Preferred embodiments of the present invention will be described with reference to the accompanying drawings:

In FIG. 1, symbol 1 denotes an audience-rating examination system as a whole, in which a broadcasting enterprise (broadcasting station) 2 generates a transport stream by respectively compressing and encoding video data and audio data into a packet in accordance with a predetermined encoding method such as MPEG2. Then, the broadcasting enterprise 2 packet-multiplexes the generated transport streams for a plurality of channels, modulates the multiplexed transport streams thus obtained in accordance with a predetermined modulation method, and then transmits the modulated transport streams to a communications satellite 3 as transmission data D1, for example, at a frequency band of 10 GHz.

The communications satellite 3 receives the transmission data D1, amplifies the transmission data D1 up to a predetermined level with a transponder (not illustrated) and generates transmission data D2 by frequency-converting the data D1 up to a frequency band of, for example, 1 GHz, and transmits the data D2 to ground user houses 4A to 4Z.

For example, an antenna 6A set to the user house 4A receives the transmission data D2 and transmits reception data D3 obtained by demodulating the transmission data D2 to a receiver (IRD) 5. The IRD 5 restores the video data and the audio data of a desired broadcast program by demultiplexing and decoding the reception data D3 as described later, and displays pictures on a monitor (not illustrated) and outputs sounds via a loudspeaker (not illustrated).

At this time, the IRD 5 stores audience-rating data serving as the selection history information of a broadcast program selected and watched by a user in an internal memory. When the audience-rating data D4 for one day is accumulated, the IRD 5 automatically transmits the audience-rating data D4 for one day through a modem 26 (FIG. 2) and a public telephone network 7 to an audience-rating totalization center 8 in a predetermined time zone every day.

The totalization center 8 computes the audience-rating result for each broadcast program based the audience-rating data D4 for one day of all received sample households (15,000 households in the case of this embodiment), and quickly notifies the broadcasting enterprise (broadcasting station) 2 of the audience-rating result data D5 so as to receive the compensation.

Figure 2:
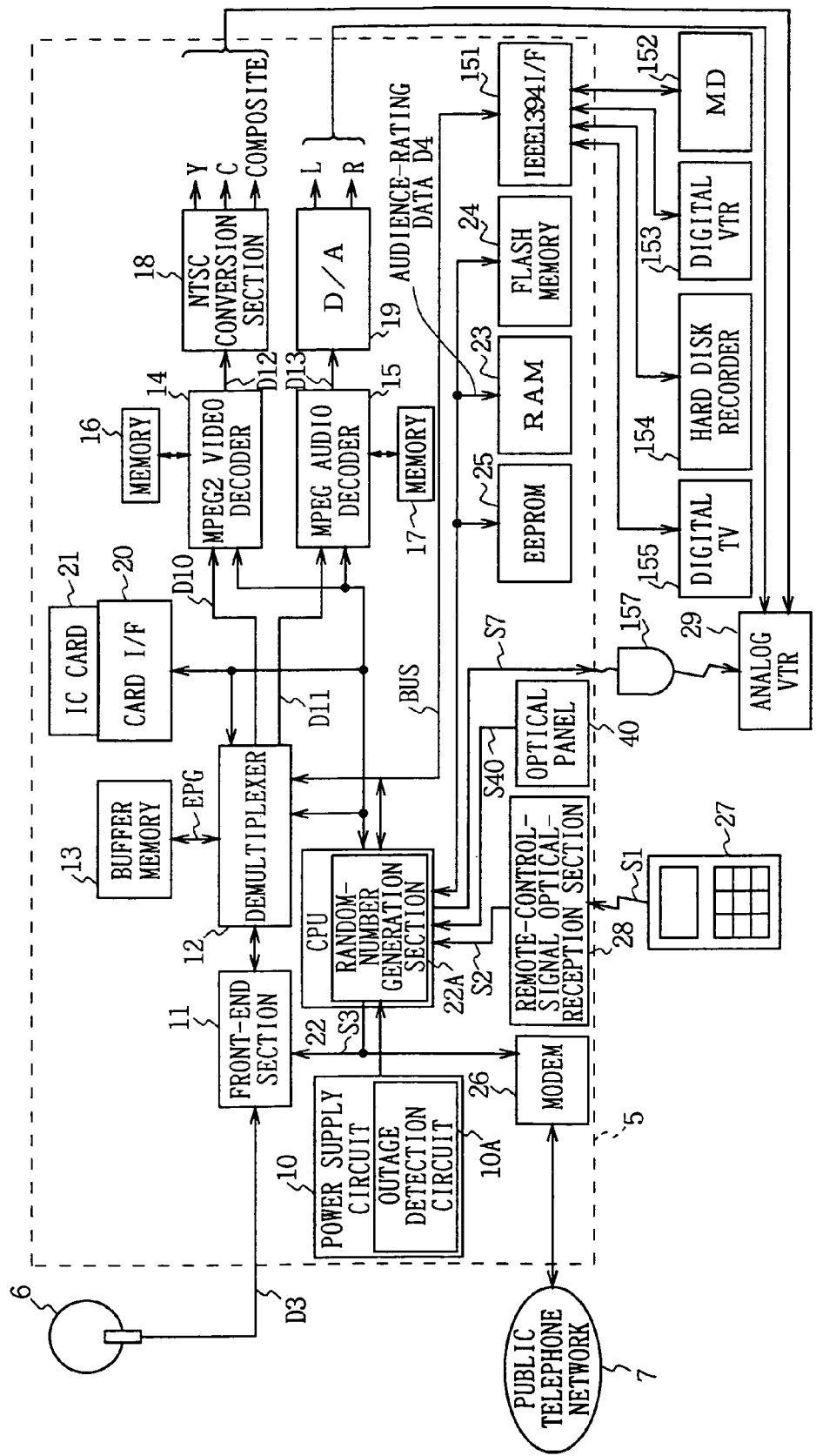
FIG. 2 is a block diagram showing a first embodiment of an IRD according to the present invention.

As shown in FIG. 2, in the case of the receiver (IRD) 5 having a broadcast-program selection history information acquisition apparatus according to the present invention, when power is supplied by a power supply circuit 10 connected to an AC outlet (not illustrated) through a plug so that a central processing unit (CPU) 22 is driven, the CPU 22 executes a processing corresponding to the operation by a remote controller 27 of the user.

The CPU 22 optically receives a remote-control signal S1 showing a channel number output from the remote controller 27 of the user with a remote-control-signal optical-reception section 28, and inputs the signal S1 as a remote-control signal S2 to the CPU 22. The CPU 22 generates a channel selection signal S3 corresponding to the input remote-control signal S2 and supplies the signal S3 to a front-end section 11.

The front-end section 11 receives the reception-data D3 received via an antenna 6, and transmits only the superimposed transport stream transmitted from the transponder for transporting the video and audio data of the selected channel, to a demultiplexer 12.

The demultiplexer 12 temporarily stores the superimposed transport stream supplied from the front-end section 11, in a buffer memory 13. Then, the demultiplexer 12 reads only the transport stream of the program having the channel number corresponding to the channel selection signal S3. On the other hand, the channel instructed by the channel selection signal S3 is compared with a contracted channel stored in an IC card 21 connected via a card interface (IF) 21, if it is determined to be the contracted channel, the cipher-key information is read from the IC card 21 in order to be supplied to the demultiplexer 12. The demultiplexer 12 de-scrambles the transport stream read from the buffer memory 13 with the cipher-key information supplied from the IC card 21. Then, packet data D10 composed of only the video data part in the transport stream de-scrambled is supplied to an MPEG2 video decoder 14, and packet data D11 composed of only the audio data part is supplied to an MPEG audio decoder 15.

The demultiplexer 12 is connected with an IEEE1394 interface 151. The demultiplexer 12 extracts the video/audio data prior to the decoding, as well as a game software or data for supplying variety of information transmitted via the communications satellite 3, or music data, in order to supply them to the IEEE1394 interface 151.

In the IC card 21, audience history information of the pay-per-view program watched by the user is accumulated as well as the contracted channel information and the cipher-key information. The audience history information is read by the CPU 22 in response to a predetermined timing or a transfer request from the charging center, and transmitted through the modem 26 and the public telephone network 7 to the charging center. Besides, the charging center and the totalization center 8 have different functions from each other, but can be located in the same place. Moreover, the charging center and the totalization center 8 can have either different telephone numbers from each other or the same. In this connection, in case where the telephone numbers are the same, it is required to transfer the data so that the information transferred from the IRD 5 can be identified as the audience-rating data or the audience history information of the pay-per-view program.

The MPEG2 video decoder 14 temporarily stores a plurality of packet data D10 constituted of a video-data part in a memory 16, converts the packet data D10 into video data D12 before being compressed and encoded by reading the packet data D10 from the memory 16 as needed and decoding the data with the MPEG2 method, and transmits the video data D12 to a national television system committee (NTSC) conversion section 18.

The NTSC conversion section 18 converts the video data D12 into an analog video signal constituted of an analog luminance (Y) signal, an analog color (C) signal and an analog composite signal, and outputs the signal to a monitor (not illustrated), and thereby displays the broadcast program having a selected channel number on the monitor screen.

The MPEG audio decoder 15 temporarily stores a plurality of packet data D11 constituted of an audio-data part in a memory 17, converts the packet data D11 into audio data D13 before being compressed and encoded by reading the packet data D11 from the memory 17 as needed and decoding the data with the MPEG audio method, and transmits the audio data D13 to a digital-to-analog conversion section 19.

The digital-to-analog conversion section 19 generates an analog left (L) audio signal and an analog right (R) audio signal by applying the digital-to-analog conversion processing to the audio data D13, and outputs the signals as stereophonic sounds via a loudspeaker (not illustrated).

Moreover, the CPU 22 is connected to a random access memory (RAM) 23, a flash memory 24 and an electrically erasable programmable read only memory (EEPROM) 25, and executes various processings by using the RAM 23 as a work area, so that it can store the audience-rating data D4 for one day watched by a user in a part of the region of the RAM 23. In this case, the region of the RAM 23 in which the audience-rating data D4 is stored has a large capacity enough to store the audience-rating data D4 for two or more days.

The flash memory 24 is constituted of a nonvolatile memory in which program information for displaying an initialization screen and an identification-number input screen to be described later or performing the process with the CPU 22 corresponding to a command selectively input by a user based on a menu screen is written. The program contents can be rewritten when new program information is received from the communications satellite 3. Such process of rewriting the program is called a download of the program.

The EEPROM 25 is also constituted of a nonvolatile memory, so as to store the final channel number information when turning off the power supply of the IRD 5 and the sound-volume state at that time. The CPU 22 is constituted so that the channel number and the sound-volume state can be set again to the same as those when the power supply of the CPU 22 is turned off, by reading the data contents stored in the EEPROM 25 when the power supply is turned on again.

The analog luminance (Y) signal, the analog color (C) signal, and the analog composite signal output from the NTSC conversion section 18 and the left (L) channel audio signal and right (R) channel audio signal output from the digital-to-analog conversion section 19 are supplied to an analog video tape recorder (VTR) 29. Therefore, when a picture-recording start command is input as a control signal S7 supplied from the CPU 22 through an infrared-radiation emission section 157, the analog VTR 29 records the analog luminance (Y) signal, the analog color (C) signal, and the analog composite signal output from the NTSC conversion section 18 and the left (L) channel audio signal and right (R) channel audio signal output from the digital-to-analog conversion section 19, on a video tape.

In this connection, the IRD 5 connects with not only the analog VTR 29 but also a plurality of digital recording/reproducing units such as an optical magnetic disc drive (MD: Mini Disc) 152, a digital VTR 153, and a hard disk recorder 154 and a digital television (TV) unit 155 through a data bus BUS and an interface (IEEE1394 I/F) 151 specified in IEEE 1394.

Therefore, the CPU 22 of the IRD 5 extracts a plurality of contents included in the reception data D3, for example, a TV program for providing video and audio signals, a data channel for providing game software and various pieces of information, or a channel for providing music (audio data), with the demultiplexer 12 in response to the operation of the remote commander 27 of the user, and supplies the extracted contents through the data bus BUS and the interface 151 to digital recording/reproducing units 152, 153, 154 and/or a digital TV unit 155 designated by the user as it is.

In this case, the CPU 22 controls a corresponding digital recording/reproducing unit (the optical magnetic recording/ reproducing unit 152, the digital VTR 153, or the hard disk recorder 154) and/or the digital TV unit 155 through the data bus BUS and interface 151 and thereby, makes the digital recording/reproducing unit perform the recording operation and makes the digital TV unit 155 MPEG-decode and display input data. Thereby, the digital recording/reproducing unit designated by the user records the contents information designated by the user, and the digital TV unit 155 outputs pictures and/or sounds recorded at this time.

In this connection, the optical magnetic disc drive 152 records and reproduces the audio data compressed and encoded in accordance with the adaptive transform acoustic coding (ATRAC) method on and from an optical magnetic disc of 2.5 inch, and receives the audio data compressed and encoded in accordance with the ATRAC method among the data separated via the demultiplexer 12. Moreover, the optical magnetic disc drive 152 directly records the audio data compressed and encoded in accordance with the ATRAC method on the optical magnetic disc (that is called a music download). Moreover, the optical magnetic disc drive 152 includes an ATRAC decoder for decoding the audio data recorded on the optical magnetic disc in accordance with the ATRAC method and thereby, the optical magnetic disc drive 152 can reproduce the audio data on the optical magnetic disc by outputting the decoded audio signals to an external loudspeaker or the like through an external output terminal (not illustrated).

Furthermore, the digital VTR 153 records and reproduces video signals and audio signals compressed and encoded in accordance with the MPEG method on and from a video tape, and receives video signals and audio signals compressed and encoded in accordance with the MPEG method among the data separated via the demultiplexer 12. Then, the digital VTR 153 directly records the video signals and audio signals compressed and encoded, on the video tape. Since the digital VTR 153 does not include the MPEG decder, the digital VTR 153 reproduces the video and audio data recorded on the video tape and supplies the reproduced data to the demultiplexer 12 through the data bus BUS and the interface 151. The demultiplexer 12 separates the data supplied from the interface 151 into the video data and the audio data in order to supply to an MPEG2 video decoder 14 and an MPEG audio decoder 15 respectively. Thereby, the digital video signal reproduced by the digital VTR 153 is decoded in the same way as the digital TV program received at the real time in order to be output to the external monitor or the loudspeaker.

Furthermore, the hard disk recorder 154 records and reproduces various pieces of information on and from the hard disk, and inputs and records various data of a channel for providing, for example, game software or various other pieces of information among the data separated via the demultiplexer 12.

Furthermore, the demultiplexer 12 extracts the electronic program guide (EPG) information superimposed and distributed on each channel at a predetermined timing, and stores the information in the buffer memory 13. The electronic program guide information includes information regarding programs of every channel (for example, channel of the program, broadcast time, title, genre, explanation of the program) from the present time to several tens of hours later. The electronic program guide information is frequently distributed at the predetermined timing so that the latest information is always recorded in the buffer memory 13.

When the user operates the remote commander 27 so that the output of the electronic program guide information is required, the CPU 22 reads the latest electronic program guide information EPG from the buffer memory 13 and stores the EPG in the memory 16 connected with the MPEG2 video decoder 14 having the function of an on screen display (OSD). The MPEG2 video decoder 14 reads the electronic program guide information stored in the memory 16 in order to perform the screen display, and output it to the external monitor connected through the NTSC conversion section 18.

The user can select a desired broadcast program by operating the remote commander 27 or an operation panel 40 while watching the electronic program guide information displayed on the monitor, and set a reservation for videotaping the program to be broadcasted in future. For example, in the case of recording a selected broadcast program with the analog VTR 29 connected externally, the user inputs the command to the CPU 22 by operating the remote commander 27 or the operation panel 40. The CPU 22 detects the start time of broadcasting the then selected program from the electronic program guide information, and waits until the detected start time of broadcasting of the program. When the start time of broadcasting of the program comes, the CPU 22 controls the front-end section 11 to select the channel of the reserved program to be videotaped, and outputs a remote commander signal specifying the start time of videotaping from the infrared-radiation emission section 157, so as to control the analog VTR 29 to record the analog video signal and audio signal from the NTSC conversion section 18 and the digital-to-analog conversion section 19.

Moreover, in the digital recording/reproducing units (optical magnetic disc drive 152, digital VTR 153, or hard disk recorder 154) connected to an external unit through the data bus BUS and the interface 151, the user can set to videotape (record) based on the electronic program guide information in the same way respectively. In this case, control for videotaping (recording) in each digital recording/reproducing unit is performed by transmitting a control command from the CPU 22 through the data bus BUS and the interface 151.

Figure 3:
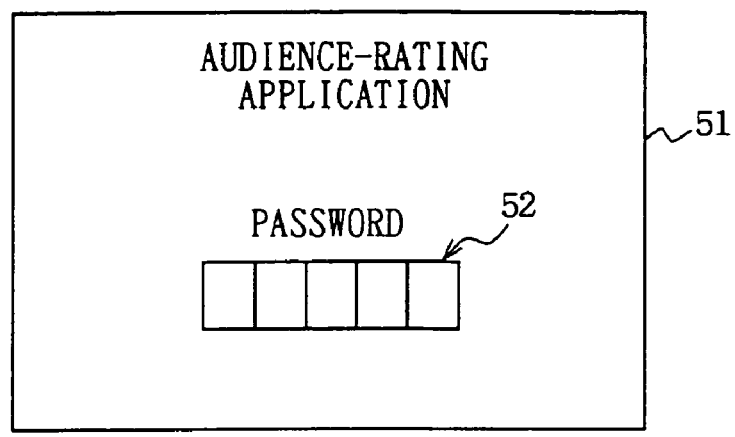
FIG. 3 is a schematic diagram showing an initialization screen.

The acquisition method of the audience-rating data of the IRD 5 characterized by the present invention is explained as follows. In the IRD 5, when a plug is set to an AC outlet for the first time after the IRD 5 is purchased, the power supply circuit 10 is started, and the power is supplied by the power supply circuit 10, the CPU 22 first reads program information stored in the flash memory 24 and thereby, displays an initialization screen 51 shown in FIG. 3 on the screen of a monitor. In the case where the user has an intention of performing the audience-rating application, the user inputs a five-digit password previously designated by the totalization center 8 to the password-input space 52 of the initialization screen 51.

Figure 4:
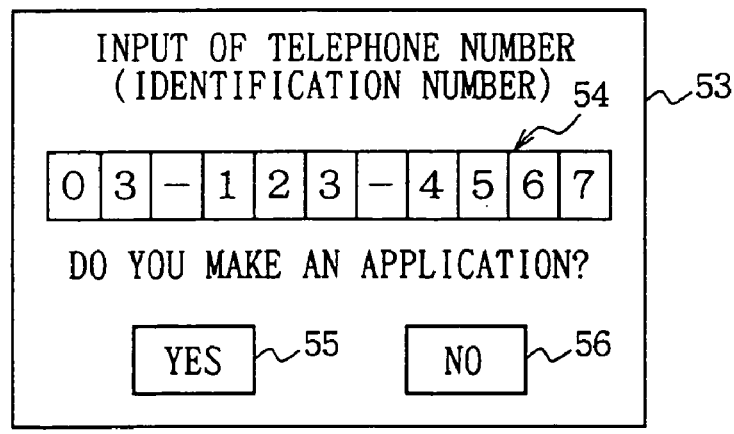
FIG. 4 is a schematic diagram showing an identification-number input screen.

In this case, the CPU 22 recognizes that the five-digit password designated by the totalization center 8 is input to the password input space 52 and then displays an identification-number input screen 53 shown in FIG. 4 on the screen of the monitor. The user inputs his telephone number connected to the public telephone network 7 in the telephone-number input space 54 of the identification-number input screen 53 starting with the area code and selects either of an icon 55 showing "yes" for finally confirming the audience-rating application or an icon 56 showing "no."

In the case where the icon 56 showing "no" is selected by the user, the CPU 22 stops processing because it decides that the user does not have the intention for audience-rating application. However, in the case where the icon 55 showing "yes" is selected, the CPU 22 uses the input telephone number as the user identification number for the audience-rating application and transmits the user identification number to the totalization center 8 through the modem 26 and the public telephone network 7. The totalization center 8 registers the transmitted user identification number.

Thereby, in the case where the audience-rating data D4 transmitted from the IRD 5 together with the user identification number matches the user identification number registered at the time of audience-rating application, the totalization center 8 accepts the audience-rating data D4. However, when the data D4 does not match the user identification number, the center 8 does not accept the data D4.

When the acquisition of the audience-rating data in the IRD 5 is set as described above, the CPU 22 controls the processings of the front-end section 11 and the demultiplexer 12 based on the remote-control signal S2 transmitted through a remote-control-signal optical-reception section 28, and always recognizes the channel number information of the broadcast program watched by the user and the time information showing selected time.

Therefore, the CPU 22 stores the channel number information and the time information when a power supply is turned on by operating the remote controller 27, the channel number information and the time information when the power supply is turned off, and the channel number information and time information when the broadcast program being watched is changed, in a part of the region of the RAM 23 as the audience-rating data D4.

Therefore, if channel numbers are not changed at all, only the time information and one type of channel number information when turning on/off a power supply are stored as the audience-rating data D4. That is, the CPU 22 reduces the amount of data to be stored by storing only the channel number information and time information after the channel are changed in the RAM 23 as audience-rating data, excepting the time when the power supply is turned on/off.

Figure 5:
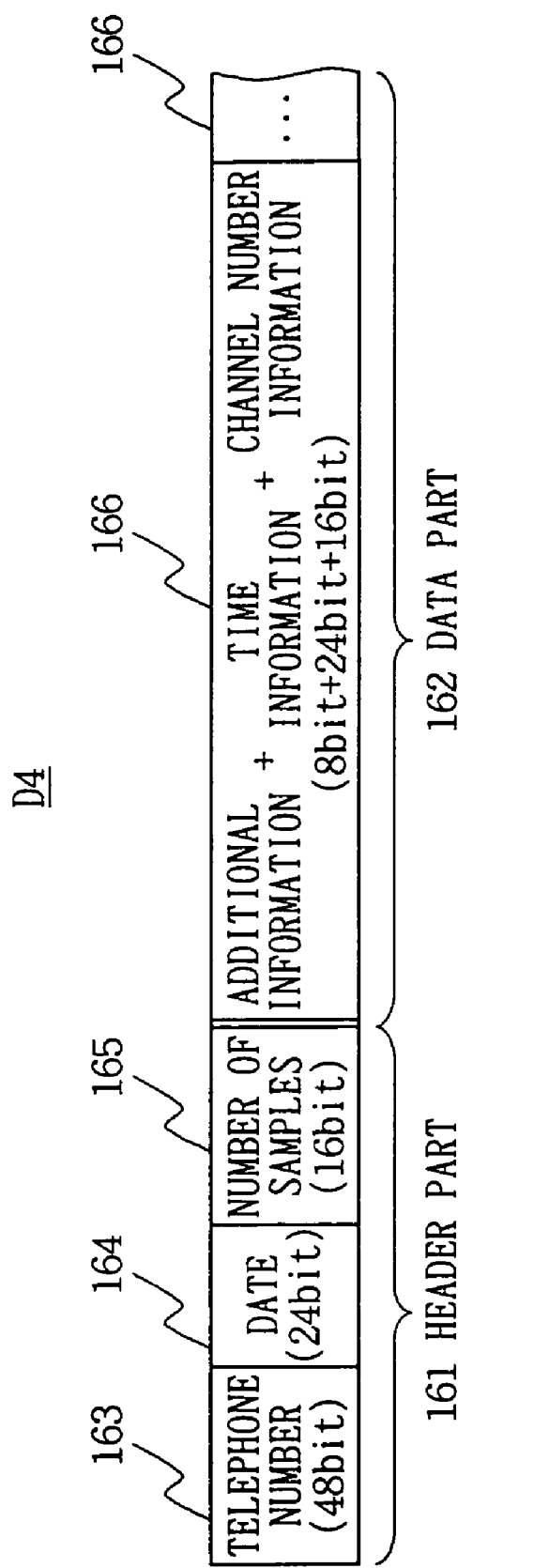
FIG. 5 is a schematic diagram showing the data structure of the audience-rating data.
Figure 6:
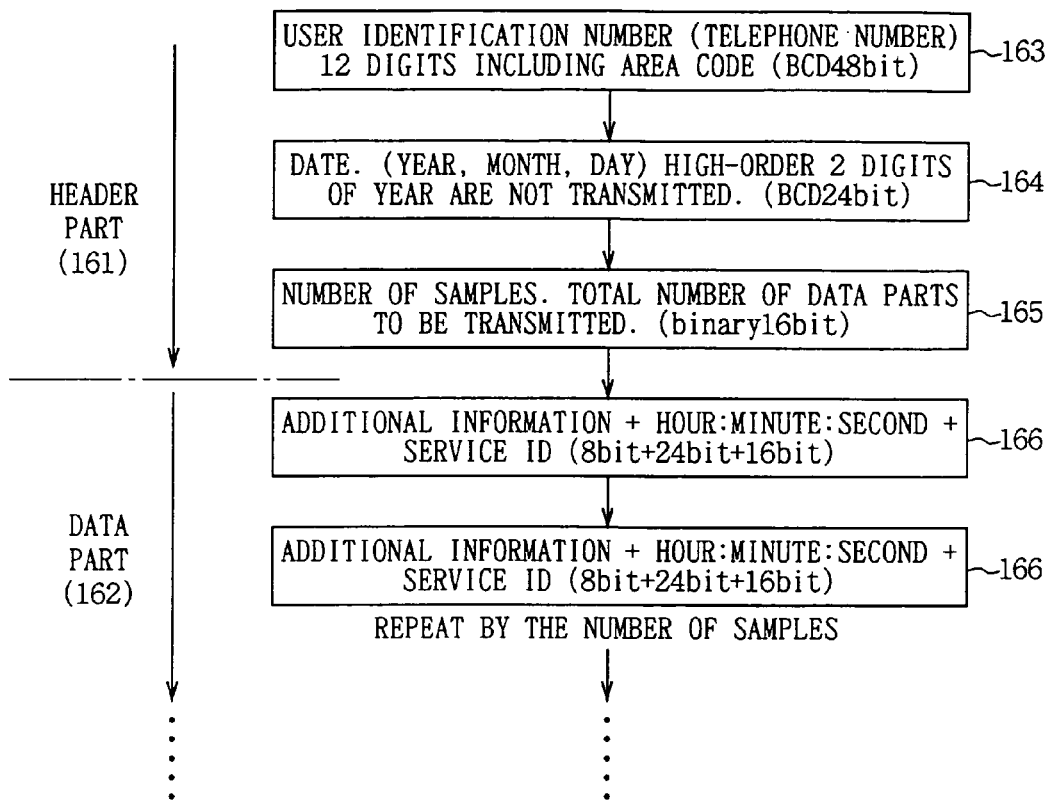
FIG. 6 is a schematic diagram showing the structure of the audience-rating data.

In this case, the CPU 22 stores not only the channel number information and the time information being watched by the user but also various pieces of additional information in the RAM 23 as audience-rating data (broadcast-program selection history information) D4. As shown in FIG. 5 and FIG. 6, the audience-rating data D4 can be divided into a header part 161 and a data part 162. The header part 161 is constituted of an identification-number information region 163 for identifying the IRD 5 by showing a user's telephone number with forty-eight bits in the binary coded decimal (BCD), a date information region 164 showing the acquisition date (High-order two digits of year are not transmitted.) of the stored audience-rating data D4 with BCD twenty-four bits, and a number-of-samples information region 165 showing the number of samples of the stored audience-rating data D4 (that is, the number of samples of the data part 162 stored after the header part 161 at that time) with binary sixteen bits.

On the other hand, the data part 162 is formed with the data showing the audition states of the user acquired by the CPU 22 in order of the acquisitions, whenever acquiring the data in one time as one data unit (sample data) 166. Every sample data 166 is assigned various pieces of additional information (eight bits), time information (twenty-four bits) when the sample data is acquired, and user-selected broadcast program information at the time when the sample data 166 (channel number information (sixteen bits)) is acquired, which are mentioned later respectively.

As shown in FIGS. 7A and 7B, the additional information assigned to each sample data 166 is constituted of eight bits as a whole. At the time when the sample data 166 is acquired, when the IRD 5 purchases TV program (for example, pay-per-view program) to watch the program or videotapes the purchased program (a timer reservation for videotaping is not set), "1" is assigned to the least significant bit. At the time when the sample data 166 is acquired, when the IRD 5 videotapes with a timer reservation, "1" is assigned to the second bit from the least significant bit. At the time when the sample data 166 is acquired, when the IRD 5 is displaying electronic program guide information EPG, "1" is assigned to the third bit from the least significant bit. At the time when the sample data 166 is acquired, when the IRD 5 is down-loading a new program for upgrading an execution program stored in the flash memory 24, "1" is assigned to the fourth bit from the least signification bit. At the time when the sample data 166 is acquired, when the IRD 5 is performing the music down-load of purchasing a music broadcast program and recording the music broadcast program in the optical magnetic recording/reproducing unit 52, "1" is assigned to the fifth bit from the least significant bit. The upper three bits are not used at present, however they are used for acquiring further additional information (for example, selection channel information of the digital TV 155) in the future.

Thus, various operation states of the IRD 5 and operation states of electric devices connected with the IRD 5 at the acquisition timings of the sample data 166 are recorded in detail as additional information in the plurality of acquired sample data 166, and stored in the RAM 23. The operation states of the electric devices except for the IRD are stored as the additional information and transferred to the totalization center 8, thereby attitudes of the audience can be known more particularly in the totalization center 8 than ever before, so that new marketing can be performed.

The CPU 22 accumulates the audience-rating data D4 having the above data structure for one day (for example, from 23:00:00 on the previous day to 22:59:59 on that day) and stores the data in the RAM 23 and thereafter, controls the modem 26 to automatically make a telephone call to the totalization center 8 by free dial between 23:00:00 on that day and 07:00:00 in the next morning. Thus, the audience-rating data D4 for one day is transmitted through the public telephone network 7. As the audience-rating data D4 for one day is transmitted between 23:00:00 on that day and 07:00:00 in the next morning when the public telephone network 7 is not crowded comparatively, congestion of lines can be avoided.

In this case, because the CPU 22 includes a random-number generation section 22A, it generates an intrinsic random number in all the IRDs 5A to 5Z for 15,000 households by the random-number generation section 22A, and assigns a transmission time zone corresponding to the random number to the telephone number (identification number) of each user. Thereby, when transmitting the audience-rating data D4 between 23:00:00 and 07:00:00, calls for 15,000 households can be efficiently transmitted without overlapping each other.

In this case, because the IRDs 5A to 5Z for 15,000 households transmit the audience-rating data D4 in the individually-assigned one-minute transmission time zone, the totalization center 8 can entirely collect the audience-rating data D4 for 15,000 households for five hours through fifty lines owned by the center 8. Thereby, the totalization center 8 can securely and easily totalize the audience-rating data D4 for 15,000 households without individually transmitting a data transfer request like the case of collection of charging information in the IC card 21 of the IRD 5, compute the audience-rating result data D5 for one day based on the audience-rating data D4 for 15,000 households, and quickly communicate the data D5 to the broadcasting enterprise 2.

The IRD 5 has an outage detection circuit 10A in the power supply circuit 10. When the IRD 5 detects outage (that is, a plug of the IRD 5 is pulled out from an AC outlet) with the outage detection circuit 10A and then, detects that supply of the power for the power supply circuit 10 is started again by connecting the plug of the IRD 5 to the AC outlet, the CPU 22 resets the once-entered audience-rating application and displays the initialization screen 51 (FIG. 3) again.

That is, in the IRD 5, a plug is surely removed from an AC outlet when the body is transferred between users. In this case, the CPU 22 detects that supply of the power is stopped. Thereafter, when the plug is inserted into the AC outlet and supply of the power is started by the power supply circuit 10 again, the CPU 22 displays the initialization screen 51 on the monitor again.

Therefore, a user to which the body of the IRD 5 is transferred decides whether he inputs the password of audience-rating application with watching the initialization screen 51. At this time, in the case where the user to whom the body is transferred has an intention for performing audience-rating application, he inputs a five-digit password designated by the totalization center 8 and then, inputs his telephone number in the identification-number input space 54 in the displayed identification-number display screen 53 (FIG. 4). Thus, the IRD 5 first recognizes that the audience-rating application is input by the user to whom the body is transferred, and newly performs the setting registration for storing and automatically transmitting the audience-rating data D4. This is because that the audience-rating data D4 is strictly private data; and it can be regarded as an invasion of the privacy that totalizing the audience-rating data D4 without an agreement of another one to whom the body of the IRD 5 is transferred, although the former owner of the IRD 5 was agree with the totalizing the audience-rating data.

The IRD 5 temporarily accepts the audience-rating application from a user, sets in the state where the audience-rating data D4 can be stored and transmitted automatically. Thereafter, in case where the IRD 5 detects that supply of power is stopped from the power supply circuit 10 and then, supply of the power is restarted, the IRD 5 does not register the setting in which the audience-rating data D4 can be stored and transmitted automatically, until the audience-rating application is regstered by the user again. Therefore, it is possible to prevent the audience-rating data D4 from being arbitrarily stored and transmitted against the intention of the user.

Thereby, the IRD 5 always recognizes that totalization of the audience-rating data D4 is permitted only when accepting the audience-rating application from the user, and stores and transmits the audience-rating data D4 since the audience-rating application was accepted. Therefore, it is possible to store and transmit the audience-rating data D4 in accordance with the intention of the user.

Figure 8:
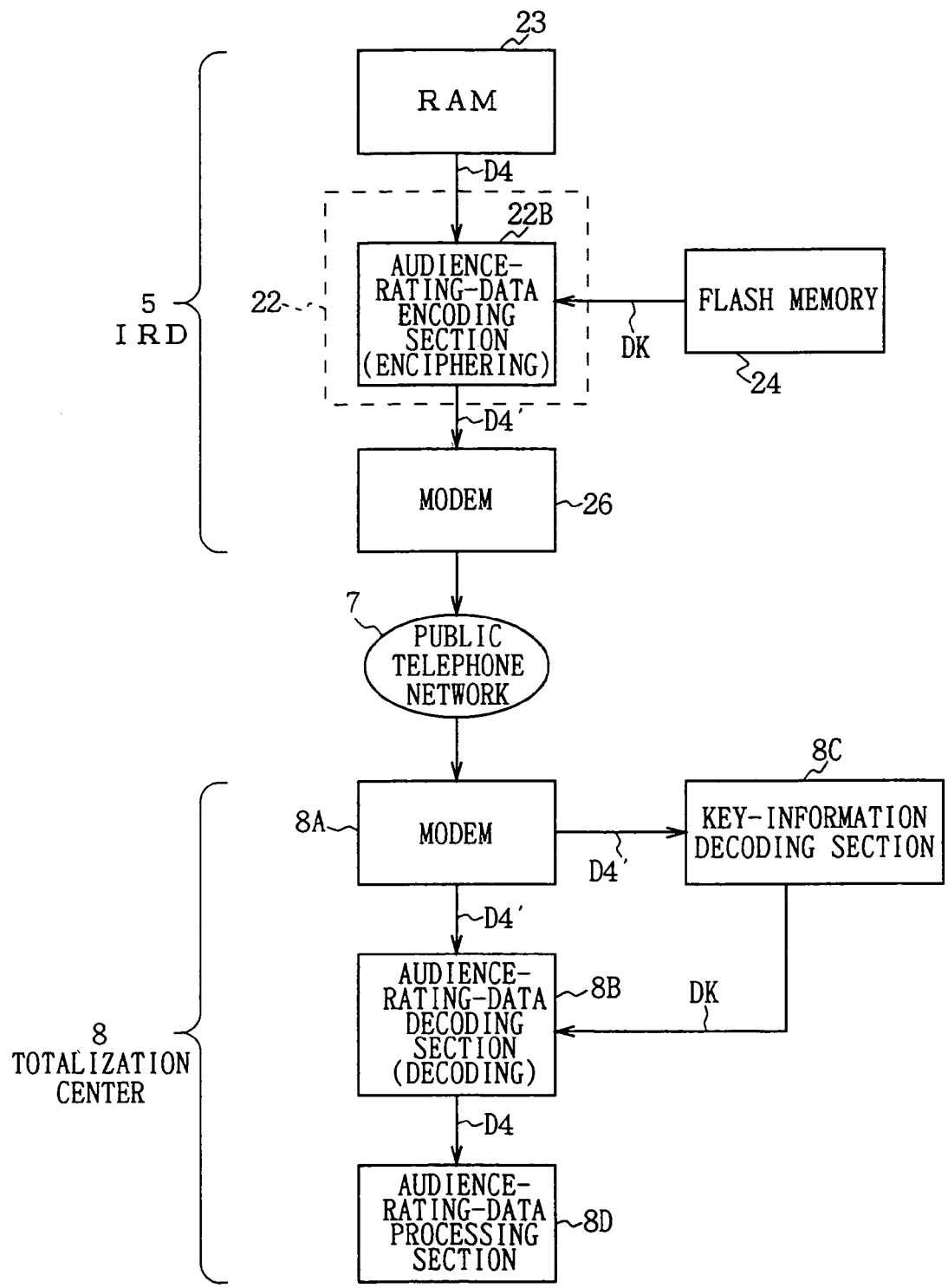
FIG. 8 is a block diagram showing the structure of a system for enciphering the audience-rating data.

In this case, the CPU 22 enciphers the audience-rating data D4 accumulated in the RAM 23 when transmitting the data D4 to the totalization center 8 through the public telephone network 7. That is, FIG. 8 shows a signal processing section for enciphering and transmitting audience-rating data to the totalization center 8, in which key information (identification code information) intrinsically assigned to the IRD 5 is previously stored in the flash memory 24. The key information is constituted of the model code and intrinsic serial number for each IRD 5 and different from each other.

Figure 9:
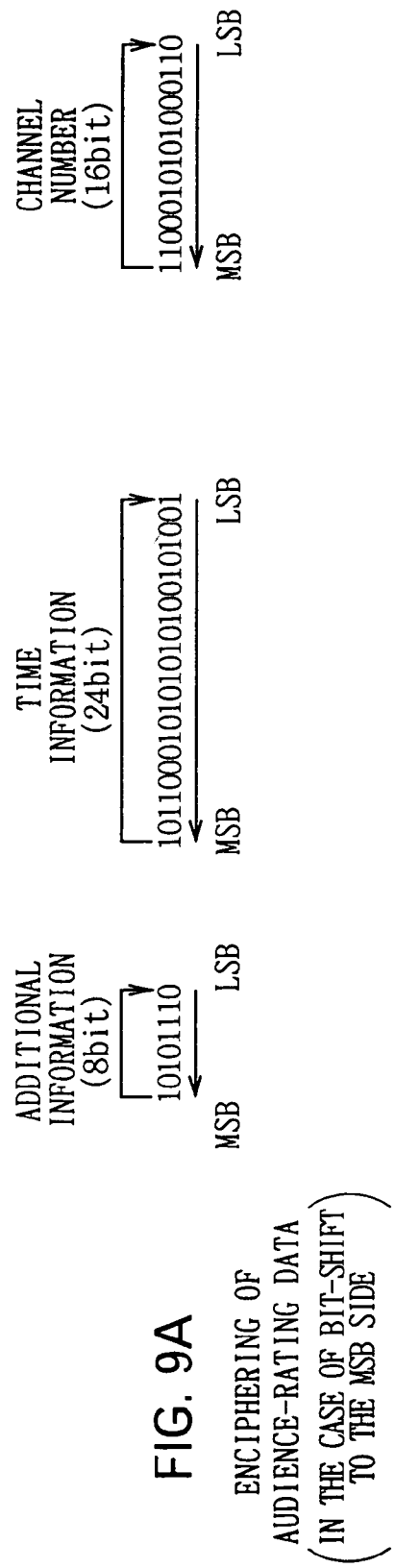
FIGS. 9A and 9B are schematic diagrams explaining enciphering of the audience-rating data.

The CPU 22 reads the key information DK from the flash memory 24 and enciphers the audience-rating data D4 read out from the RAM 23 by using the key information DK. FIGS. 9A and 9B show an example of the method for enciphering the data D4. That is, as shown in FIGS. 9A and 9B, in the case where the key information stored in the flash memory 24 is "18703254", the audience-rating-data encoding section 22B of the CPU 22 first shifts the additional information, the time information and the channel number of the audience-rating data D4 to the MSB side every four digits in accordance with the value (key) "4" assigned to the least significant digit of the key information as shown in FIG. 9A. In this case, the bit at the MSB is shifted to the LSB side.

Then, the section 22B shifts the additional information, the time information and the channel number of the audience-rating data D4 to the LSB side every five digits in accordance with the key "5" at the second digit from the least significant digit of the key information.

Then, the section 22B shifts the additional information, the time information and the channel number of the audience-rating data D4 to the MSB side every two digits in accordance with the key "2" at the third digit from the least significant digit of the key information.

Thus, by shifting the audience-rating data D4 to the MSB side and LSB side alternately by successively using digits starting with the least significant digit of the key information, the audience-rating data D4 is enciphered.

Moreover, the audience-rating-data encoding section 22B of the CPU 22 enciphers the key information then used in addition to the audience-rating data D4. As for the method for enciphering the key information, in the case where the key information is "18703254" for example, the key information is delimited every two digits and respective two digits are replaced as shown in FIG. 9B. Thereby, the key information "18703254" is converted into enciphered key information "81072345".

Thus, the audience-rating-data encoding section 22B of the CPU 22 transmits the enciphered data D4' constituted of enciphered audience-rating data (enciphered data) and enciphered key information to a modem 8A of the totalization center 8 through the modem 26 and public telephone network 7.

The modem 8A supplies the enciphered data D4' to a key-information decoding section 8C and an audience-rating-data decoding section 8B. The key-information decoding section 8C delimits the enciphered key information (e.g. "81072345") included in the enciphered data D4' every two digits in order to replace the enciphered information every delimited two digits and thereby, restores the key information (e.g. "18703254") before being enciphered and supplies the restored key information DK to the audience-rating-data decoding section 8B.

The audience-rating-data decoding section 8B deciphers the enciphered audience-rating data included in the enciphered data D4' supplied from the modem 8A by using the key information DK supplied from the key-information decoding section 8C. The deciphering method conforms to the reverse procedure to the enciphering method described for FIG. 9A, which bit-shifts audience-rating data to the MSB side or the LSB side by a value shown by a key, successively using values (keys) starting with the value of the least significant digit of the key information DK.

Thereby, the audience-rating data D4 before being enciphered is restored, and the audience-rating-data decoding section 8B transmits the restored audience-rating data D4 to an audience-rating-data processing section 8D so as to totalize the data D4.

Thus, the key information DK enciphered at the IRD 5 side is transmitted to the totalization center 8 together with the enciphered audience-rating data, and the totalization center 8 restores the enciphered key information DK and deciphers the audience-rating data D4 by using the restored key information DK. Thereby, it is possible to secure the security in that the key information DK intrinsic to each IRD 5 is necessary when deciphering the enciphered audience-rating data, and make it easy to construct an enciphering system in that the key information necessary for deciphering can be transmitted to the totalization center 8 through the same line.

For the above embodiment, a case is described in which the audience-rating data D4 is stored in a part of the region of the RAM 23 set in the IRD 5. However, the present invention is not restricted to the above case, but it is also possible to separately provide a memory for storing only the audience-rating data D4 to store the data D4 in the memory.

Figure 10:
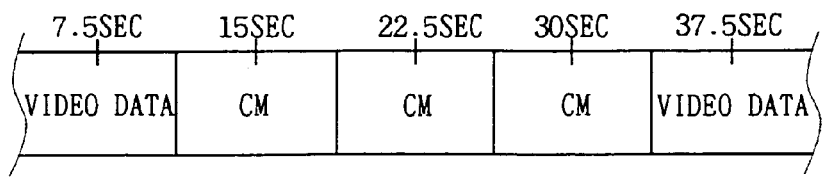
FIG. 10 is a schematic diagram showing the storing timing for the audience-rating data.

Moreover, for the above embodiment, a case is described in which the channel number information and time information when turning on/off a power supply and changing the channel numbers, as a predetermined acquisition timing, are stored in the RAM 23 as the audience-rating data D4. However, the present invention is not restricted to the above case, but it is also possible to store the audience-rating data D4 for every seven-point-five seconds which is shorter than the shortest broadcast-program constitution period (for example, approximately fifteen seconds for a commercial) of each broadcast-program constitution period of a plurality of broadcast programs. In this case, by storing the audience-rating data D4 in the intervals of commercials as shown in FIG. 10, it is possible to store the audience-rating data D4 of a commercial other than the audience-rating data of a broadcast program, and store and transmit higher-accuracy audience-rating data.

Furthermore, for the above embodiment, a case is described in which the channel number information and time information when turning on/off a power supply and changing channel numbers, as a predetermined acquisition timing, are stored in the RAM 23 as the audience-rating data D4 and transmitted. However, the present invention is not restricted to the above case, but in case where the same channel number information is consecutively detected as the history of broadcast programs stored, for example, in every one minute, it is also possible to transmit only the channel number information and the consecutive number of times of the information as the audience-rating data D4.

Furthermore, for the above embodiment, a case is described in which a broadcast-program selection history information acquisition apparatus according to the present invention is constituted of the RAM 23 and the CPU 22 serving as storage means and the modem 26 and the CPU 22 serving as transmission means. However, the present invention is not restricted to the above case, but it is also possible to constitute the broadcast-program selection history information acquisition apparatus by various other storage means and transmission means.

Furthermore, for the above embodiment, a case is described in which a broadcast-program selection history information acquisition apparatus according to the present invention is applied to the receiver (IRD) 5 for digital satellite broadcasting. However, the present invention is not restricted to the above case, but it is also possible to apply the broadcast-program selection history information acquisition apparatus to a television receiver which is capable of receiving digital ground-wave-broadcasting, or a set-top box of a cable-television.

Moreover, in the present invention, it is also possible to store the identification information showing the type of the broadcasting enterprise 2 as the audience-rating data D4 in the case where the IRD 5 receives the transmission data stream D2 from the broadcasting enterprise 2 serving as supply destinations of two or more companies.

Moreover, for the above embodiment, a case is described in which the audience-rating application is once set by using the initialization screen 51 and the identification-number input screen 53 and thereafter, the initialization screen 51 and the identification-number input screen 53 are displayed again to make a user set the audience-rating application after supply of the power is turned off and then turned on. However, the present invention is not restricted to the above case, but it is also possible to make a user set the audience-rating application by displaying only the identification-number input screen 53 again. In short, it is possible to set the audience-rating application in accordance with any one of various other methods instead of automatically returning to the setting of storing and transmitting the audience-rating data D4, as long as a user sets the audience-rating application based on his intention again.

Moreover, for the above embodiment, a case is described in which an intrinsic transmission time zone is assigned to each user in accordance with a random number generated by the random-number generation section 22A by using a telephone number as an identification number. However, the present invention is not restricted to the above case, but it is also possible to store the time information when performing the audience-rating application in the RAM 23, use the time information as an identification number, and assign the transmission time zone for one minute to users starting with a user having the earliest time information.

Figure 11:
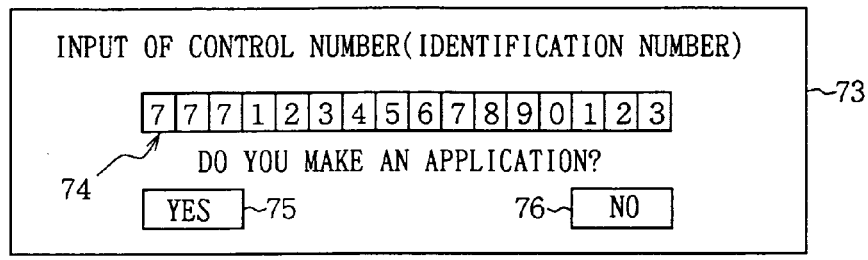
FIG. 11 is a schematic diagram showing the control-number input screen.

Moreover, for the above embodiment, a case is described in which a telephone number is used as an identification number. However, the present invention is not restricted to the above case, but in the case where a user has an intention for performing the audience-rating application, it is possible to display a control-number input screen 73 as shown in FIG. 11 after the five-digit password described above is input to the initialization screen 51, and make the user input an intrinsic control number previously communicated (printed in an operation manual, etc.) by the totalization center 8.

Figure 12:
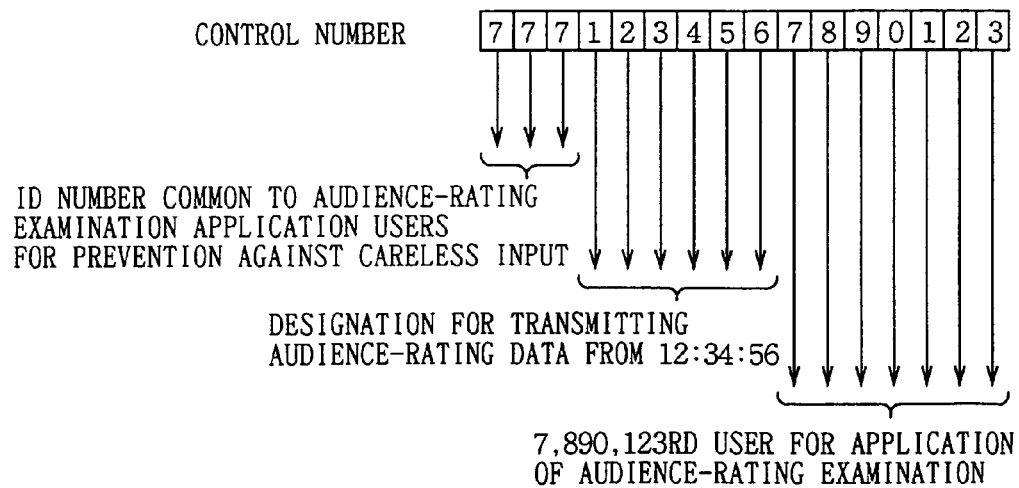
FIG. 12 is a schematic diagram showing the structure of a control number.

In this case, the control number previously communicated to the user from the totalization center 8 is 16-digit information intrinsically assigned to each user (IRD) as shown in FIG. 12, in which the ID number "777" common for performing the application for audience-rating examination is assigned to high-order three digits and the transmission time of the audience-rating data D4 to the totalization center 8 assigned to the user (IRD) is assigned to six digits following the above three digits. In the case of FIG. 12, the transmission time is "123456" which shows that the audience-rating data D4 is transmitted to the totalization center 8 starting with 12:34:56. Moreover, seven digits following the transmission time show a serial number assigned to the user who applies the audience-rating examination. In the case of FIG. 12, the serial number is "7890123" which shows that the 7,890,123rd application for the audience-rating examination.

When the control number is input by the user, the CPU 22 stores the control number in the RAM 23. When an internal timer indicates the transmission time assigned by the control number, the CPU 22 transmits the audience-rating data D4 then stored in the RAM 23 to the totalization center 8 through the modem 26 and the public telephone network 7. In this connection, at the time of the transmission, the control number is transmitted instead of the telephone number of the identification-number information region 163 in the header part 161 shown in FIG. 5 described above. Thus, by assigning a specific transmission time to each user (IRD 5) as a control number, it is possible to set a specific transmission time for each area of users (IRD 5) or to set the transmission time of the audience-rating data D4 in accordance with age of audience-rating examination contractors (users). Thereby, the totalization center 8 can collect the time for accepting the audience-rating data D4 in a certain period in accordance with the groups when grouping the users (IRD 5) in accordance with characters such as area or age of them, so that the totalization flexibility can be improved because of simultaneously totalizing the audience-rating data D4 in accordance with the groups.

Figure 13:
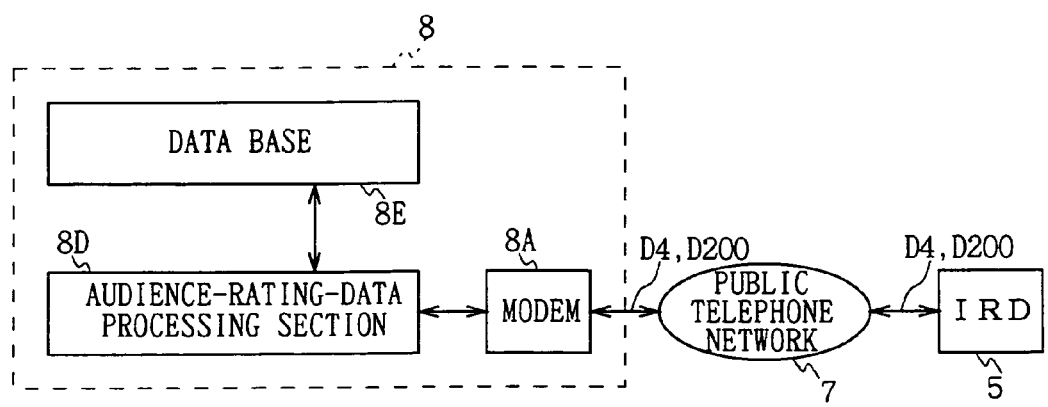
FIG. 13 is a block diagram explaining transmission and reception of the audience-rating data and an audience-rating-data change command.

Moreover, as shown in FIG. 13, when the IRD 5 connects a line to the totalization center 8, the data processing section 8D of the totalization center 8 accepts the audience-rating data D4 transmitted from the IRD 5 through the modem 8A, and in the case where it is necessary to change the contents of the audience-rating data D4 for the IRD 5, the section 8D transmits a change command D200 for the audience-rating data D4 to the IRD 5.

When the change command D200 is input, the CPU 22 of the IRD 5 rewrites a program for acquiring an audience rate in the flash memory 24 according to the command D200 and changes the information contents to be acquired and transmitted as the audience-rating data D4 to the totalization center 8. For example, when a command for changing the telephone number of the totalization center 8 from a designated date is transmitted from the totalization center 8 to the IRD 5 as the change command D200, the CPU 22 of the IRD 5 changes the telephone number of the destination, to which the audience-rating data D4 is transmitted, from the designated date in accordance with the change command D200.

Moreover, when a command for changing the transmission time of the audience-rating data D4 to the totalization center 8 set by the control number is transmitted from the totalization center 8 to the IRD 5 as the change command D200, the CPU 22 of the IRD 5 rewrites a part of the control numbers (transmission time) in the flash memory 24 in accordance with the change command D200 and thereby changes the transmission time of the audience-rating data D4. Thereby, for example, when the totalization center 8 newly groups a plurality of users (IRD) in accordance with areas or age of users, it is possible to reset the transmission time according to each group to a new transmission time.

Furthermore, when a command for stopping the transmission of the audience-rating data D4 is transmitted from the totalization center 8 to the IRD 5 as the change command D200, the CPU 22 of the IRD 5 stops the acquisition of the audience-rating data D4 and the transmission of the data D4 to the totalization center 8 in accordance with the change command D200.

Furthermore, when a command for changing the contents of the audience-rating data D4 is transmitted from the totalization center 8 to the IRD 5 as the change command D200, the CPU 22 of the IRD 5 thereafter changes the contents to be acquired as the audience-rating data D4 and transmitted to the totalization center 8 in accordance with the change command D200. In this case, there are items to be changed, such as changing the time interval of acquiring the audience-rating data D4 and storing the data D4 in the RAM 23 from every 10 sec up to then into every 30 sec, or changing the contents of the above additional information described for FIG. 7 into new contents.

Thus, when the IRD 5 connects a line to the totalization center 8, it is possible to change various setting items concerning the audience-rating data D4 set to the IRD 5 in accordance with the change of totalization processings of the totalization center 8 by transmitting the change command D200 from the totalization center 8 to the IRD 5 and changing the acquisition contents and the transmission time of the audience-rating data D4, and the like. In this connection, various setting items concerning the audience-rating data D4 are stored in a data base 8E of the totalization center 8 together with the control number (identification number) of each user (IRD), and the audience-data processing section 8D rewrites the data base 8E in accordance with the change of setting items.

In the above structure, the totalization center 8 previously communicates an individual control number to each user (IRD) and the user sets the control number to the IRD 5. Thereby, an intrinsic control number is stored in the flash memory 24 of the IRD 5 as the identification number and the control number (identification number) is registered in the totalization center 8 through the setting operation by the user.

The control number is constituted of the time for transmitting the audience-rating data D4 from a user house to the totalization center 8 and a serial number assigned to the user (IRD) who participates in audience-rating examination, and it serves as a number intrinsic to each IRD. Therefore, as compared with the case where a telephone number of a user house is used as an identification number, even in the case where only one telephone line is connected to a user house and a plurality of IRDs 5 are set in the user house, since an individual control number is assigned to each IRD 5, the totalization center 8 can individually totalize the audience-rating data D4 in accordance with the control number assigned to each IRD 5.

Moreover, as the totalization center 8 uses the time for transmitting the audience-rating data D4 from the IRD 5 to the totalization center 8 as a control number, it is possible to assign the time to each area or each age of user, and collect the transmission time of the audience-rating data D4 according to each group when grouping users (IRD) in accordance with characters such as area or age.

Furthermore, when the audience-rating data D4 is transmitted from the user house (IRD 5) through the public telephone network 7 to the totalization center 8, by using the connection of the public telephone network 7, the totalization center 8 transmits the change command D200 for the audience-rating data D4 to the IRD 5 in order to change the contents and the transmission time of the audience-rating data D4, thereby it can optionally and easily change the contents and the transmission time of the audience-rating data D4 once decided in initialization, according to convenience at the side of the totalization center 8.

Thus, according to the above structure, it is possible to totalize the audience-rating data D4 for each IRD based on the control number (identification number) intrinsic to the IRD 5, and easily perform high-flexible totalization for the audience-rating data D4 by optionally changing the contents and the transmission time of the audience-rating data D4.

For the above embodiment, a case is described in which the time for transmitting the audience-rating data D4 to the totalization center 8 is used as the control number (identification number) assigned to the IRD 5. However, the present invention is not restricted to the above case, but it is also possible to assign various pieces of information such as the code information for each area of the IRDs 5 (user houses) or each age of user. In this case, the totalization center 8 can decide the transmission time in accordance with each area of the IRDs 5 or each age of user and set the transmission time with the change command D200.

Moreover, for the above embodiment, a case is described in which items such as the contents (additional information, etc.) of the audience-rating data D4, the telephone number of the totalization center 8, a step of transmission and a change of the transmission time are changed by transmitting the change command D200 from the totalization center 8 to the IRD 5. However, the present invention is not restricted to the above case, but it is also possible to add new acquisition information necessary for totalization in the totalization center 8.

In the case of the above structure, the IRD 5 stores the audience-rating data D4 for one day in the internal RAM 23 and automatically transmits the data D4 to the totalization center 8 in the predetermined time period (between 23:00:00 and 7:00:00). Therefore, the IRD 5 can efficiently transmit the audience-rating data D4 in days, and automatically transmit the data D4 without receiving an instruction such as a transfer request.

Therefore, the totalization center 8 can easily totalize the audience-rating data D4 without individually transmitting the transfer request of the audience-rating data D4 to IRDs 5A to 5Z, so that the communication cost can be reduced by a value equivalent to unnecessary transmission of the transfer request of the audience-rating data D4.

Moreover, the CPU 22 of the IRD 5 acquires information indicating that timer reservation of the VTR is set, as additional information of the audience-rating data D4. Thereby, the totalization center 8 can recognize the possibility that the program is watched repeatedly because of being recorded into the VTR, as well as the information that a user merely displays the broadcast program on a monitor to watch it. Therefore, by totalizing the audience-rating so as to increase the value of videotapes, which can be watched repeatedly, of a broadcast program, commercial video software, and the like as the audience-rating data, the totalization center 8 can further accurately check the audition state of the user.

Moreover, the CPU 22 of the IRD 5 acquires the presence or absence of the audition of the electronic program guide information EPG as the additional information for the audience-rating data D4. Thereby, for example, when a user displays the electronic program guide information EPG on the monitor while receiving a commercial or a broadcast program by selecting a channel, the audition state of the electronic program guide information EPG is assigned to the audience-rating data D4 as the additional information. Thereby, while the user watches the electronic program guide information, the totalization center 8 can confirm that the commercial or the broadcast program of the channel then selected is not watched by the user, so that the audience rate of the commercial or the broadcast program can be corrected.

Furthermore, the CPU 22 of the IRD 5 can accurately check the detailed audience mode of the user by acquiring the information for down-load of music software or upgrading of an execution program as the additional information for the audience-rating data D4.

Furthermore, the IRD 5 enciphers the acquired audience-rating data D4 by using a predetermined enciphering method and thereafter transmits the enciphered data to the totalization center 8. Thereby, in the case of totalization through the public telephone network 7, it is possible to totalize the audience-rating data D4 while effectively protecting the privacy of the user.

Furthermore, according to the present invention, since selection history information is stored and transmitted only in the case where start of the input of the power is detected and it is set to store and transmit the selection history information, it is possible to protect the privacy of a user without storing and transmitting selection history information against the intention of the user. Thus, a broadcast-program selection history information acquisition apparatus and its method capable of storing and transmitting selection history information in accordance with the intention of the user can be realized.

Furthermore, according to the present invention, the selection history information of a selected broadcast program is transmitted at an intrinsically-assigned predetermined transmission timing, thereby a broadcast-program selection history information acquisition apparatus and its method capable of preventing external transmission and call from overlapping each other and efficiently performing the transmission can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A broadcast-program selection history information acquisition apparatus operable in a system including a multiplicity of said broadcast-program selection history information acquisition apparatuses and a notification destination, said broadcast-program selection history information acquisition apparatus comprising:
   storage means operable to store selection information regarding the selection of broadcast programs at predetermined acquisition times from among programs broadcast on a plurality of channels; and
   transmission means operable to periodically transmit selection history information to the notification station at a transmission timing assigned at random in accordance with an intrinsic random number, and not in response to a data transfer request received from a device external to said broadcast-program selection history information acquisition apparatus, said selection history information including a plurality of pieces of said selection information stored at a plurality of said acquisition times, said transmission timing being assigned within a predetermined restricted range of hours beginning at a predetermined time of day in which said multiplicity of said broadcast-program selection history information acquisition apparatuses are restricted to transmit.

2. The broadcast-program selection history information acquisition apparatus according to claim 1, wherein said selection history information includes channel number information regarding said selected broadcast programs and time information showing the time when said broadcast programs are selected.

3. The broadcast-program selection history information acquisition apparatus according to claim 1, wherein said selection history information includes an identification number intrinsically assigned to said broadcast-program selection history information acquisition apparatus.

4. The broadcast-program selection history information acquisition apparatus according to claim 1, wherein said transmission means is operable to transmit said selection history information through a predetermined line, and said broadcast-program selection history information acquisition apparatus is operable to change at least one of a setting for said predetermined acquisition times and a setting for said transmission timing based on a change command transmitted from said notification destination through said line.

5. A broadcast-program selection history information acquisition apparatus according to claim 1, wherein said transmission means is operable to transmit a header when transmitting said selection history information, said header including an identification number, said identification number including a telephone number belonging to a user of said apparatus.

6. A broadcast-program selection history information acquisition apparatus, comprising:
    storage means operable to store selection information regarding the selection of broadcast programs at predetermined acquisition times from among programs broadcast on a plurality of channels;
    transmission timing assignment means operable to generate a random number and to assign a transmission timing corresponding to the random number based on a telephone number assigned to said telephone line; and
    transmission means operable to transmit selection history information including a plurality of pieces of said selection information stored at a plurality of said acquisition times through a predetermined telephone line to a notification destination at said transmission timing.

7. A method of acquiring selection history information, comprising the steps of:
    providing a multiplicity of broadcast-program selection history information acquisition apparatuses;
    storing selection information regarding the selection of broadcast programs at predetermined acquisition times by said apparatuses from among programs broadcast on a plurality of channels; and
    periodically transmitting selection history information from said apparatuses to a notification destination at transmission timings assigned at random in accordance with an intrinsic random number within a predetermined restricted range of hours beginning at a predetermined time of day, said selection history information including a plurality of pieces of said selection information stored at a plurality of said acquisition times, said transmitting performed not in response to a data transfer request from a device requesting to receive said selection history information.

8. The method according to claim 7, wherein said selection history information includes channel number information regarding said selected broadcast programs and time information showing the times when said broadcast programs are selected.

9. The method according to claim 7, wherein said selection history information includes an identification number intrinsically assigned to a particular one of said broadcast-program selection history information acquisition apparatuses.

10. The method according to claim 7, wherein said selection history information is transmitted to said notification destination through a predetermined line, said method further comprising changing at least one of a setting for said predetermined acquisition times and a setting for said transmission timing based on a change command received from said notification destination through said line.

11. The method according to claim 7, further comprising transmitting a header when transmitting said selection history information, said header including an identification number, said identification number including a telephone number belonging to a user of said apparatus.

12. A method of acquiring selection history information comprising the steps of:
    storing selection information regarding the selection of broadcast programs at predetermined acquisition times from among programs broadcast on a plurality of channels; and
    transmitting selection history information including a plurality of pieces of said selection information stored at a plurality of said acquisition times through a predetermined telephone line at an intrinsic transmission timing, said transmission timing being assigned by a device performing said transmitting by generating a random number and assigning said transmission timing corresponding to said random number based on a telephone number assigned to said predetermined telephone line.

13. Apparatus for use in acquiring broadcast-program selection history information, the apparatus comprising:
    a front end section operable to select a broadcast program from among programs broadcast on a plurality of channels in accordance with a selection input provided by a user;
    a memory operable to store selection information associated with the selected broadcast program;
    a random number generator operable to generate a random number; and
    a transmitter operable to transmit a signal representative of audience rating data based on the stored selection information to a notification destination at a transmission timing assigned at random in accordance with said random number, and not in response to a data transfer request from a device external to said apparatus, said transmission timing being assigned within a predetermined restricted range of hours beginning at a predetermined time of day.

14. An apparatus according to claim 13, wherein said transmitter is operable to transmit a header when transmitting the signal, said header including an identification number, said identification number including a telephone number belonging to a user of said apparatus.

15. A broadcast-program selection history information acquisition apparatus comprising:
    a storage unit operable to store selection information regarding the selection of broadcast programs at respective acquisition times from among programs broadcast on a plurality of channels;
    a transmitter operable to transmit selection history information including a plurality of pieces of said selection information stored at a plurality of said acquisition times to a notification destination at a predetermined transmission timing; and
    a processor operable to cause said selection information to be stored in said storage unit, to cause said selection history information to be transmitted by said transmitter, and to require authorizing input from a user upon each restoration of power to said broadcast-program selection history information acquisition apparatus after a loss of power thereto, as a condition to causing said selection information to be stored in said storage unit and to causing said selection history information to be transmitted by said transmitter.

16. A broadcast-program selection history information acquisition apparatus as claimed in claim 15, further comprising a power-supply detection circuit operable to detect at least one of the loss of power to said broadcast-program selection history information acquisition apparatus and the restoration of power thereto after loss.

17. A broadcast-program selection history information acquisition apparatus as claimed in claim 16, wherein the power is alternating current (AC) power.

18. The broadcast-program selection history information acquisition apparatus as claimed in claim 15, further comprising a user application executable by said processor to acquire said selection information based on user selection input, wherein said processor is operable to initialize said user application in response to the restoration of power, said authorizing input being required for execution of said user application.

* * * * *